UNITED STATES PATENT OFFICE.

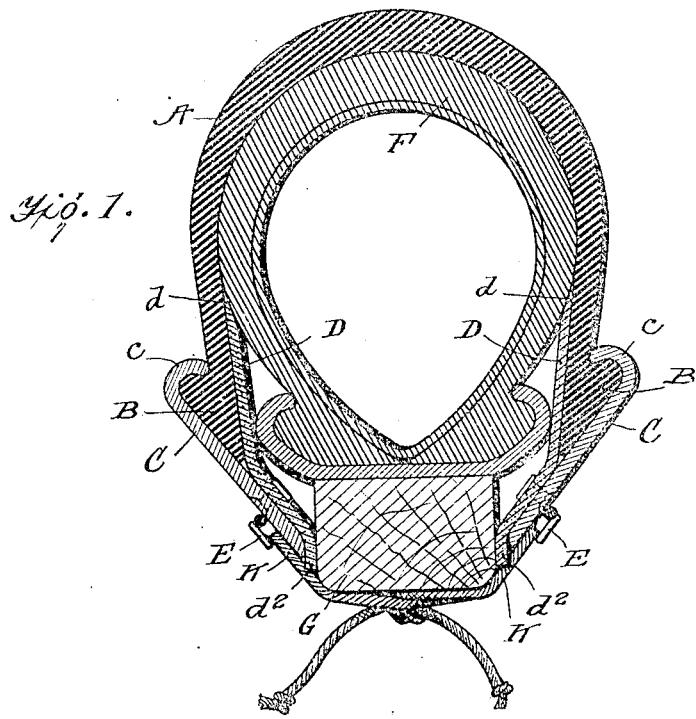
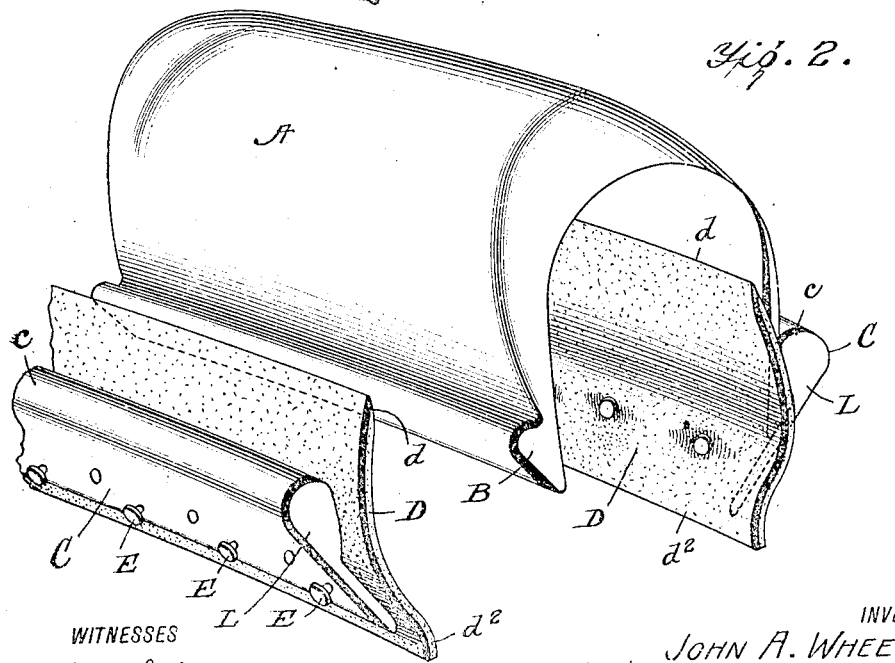

JOHN A. WHEELER, OF ONAWAY, MICHIGAN.

TIRE-PATCH.

No. 925,969.　　　Specification of Letters Patent.　　Patented June 22, 1909.

Application filed March 30, 1909. Serial No. 486,702.

*To all whom it may concern:*

Be it known that I, JOHN A. WHEELER, a citizen of the United States, and a resident of Onaway, in the county of Presque Isle and State of Michigan, have made certain new and useful Improvements in Tire-Patches, of which the following is a specification.

My invention relates to means for patching pneumatic tires and it consists in the combinations, constructions and arrangements herein described and claimed.

An object of my invention is to provide a device by which the worn outer surface of a rubber tire may be protected and which may be readily applied without the necessity of special tools.

A further object of my invention is to provide an emergency patch which may be cheaply made from old tires which have been discarded.

Other objects and advantages will appear in the following specification and the novel features of the device will be particularly pointed out in the appended claims.

My invention is illustrated in the accompanying drawings in which—

Figure 1 is a section through the rim of a wheel, its tire and the patch, and Fig. 2 is a detail perspective view showing the parts of the patching device.

In carrying out my invention I make use of a section of an old clencher tire A having the usual attaching beads B. The length of the section may vary, but in practice I prefer to use a strip 7 to 10 inches long.

The gripping member consists of a metal plate C having an upper curved edge $c$ in the form of a hook. To the lower part of the plate C is riveted a strip of tough resilient material D preferably of leather having an upper beveled edge $d$. Buttons or hooks E are provided on the outer surface of the plate C to which the cords or laces K may be attached.

From the foregoing description of the various parts of the device the operation thereof may be readily understood.

The section F of the outer tire which is to be covered is wrapped with the strip A of the old tire. The beads B are inserted between the plates C and their respective leather backings D, the hooked portions $c$ engaging the beads as shown in Fig. 1. The beveled portion of the backing strip D lies against the tire F while its lower portion $d^2$ protects the felly G of the wheel from being marred by the plate. The laces or cords K are now brought around the felly and are tied tightly together. In order to prevent the patch from slipping endwise, I have arranged the end flanges L on the plates C.

I am aware that other forms of the device based upon the same general idea might be made but I consider as my own all such modifications as fairly fall within the spirit and the scope of the invention.

I claim:

1. A tire patch comprising, an outer resilient covering adapted to encircle a tire and provided with beads on its opposite edges, metal plates each having a curved gripping flange arranged to engage said beads, a resilient backing secured to each of said plates and having a portion arranged to extend between said plate and the tire and cords for tying said plates together.

2. A tire patch comprising an outer resilient covering adapted to encircle a tire and provided with beads on its opposite edges, a pair of metal plates, each having a curved gripping flange arranged to engage said beads, a tough resilient backing secured to each of said plates, one portion of said backing being arranged to extend between said plate and the tire and another portion being arranged to extend between said plate and the felly of the wheel and cords attached to said plates and adapted to bear on said felly for securing said plates together.

JOHN A. WHEELER.

Witnesses:
J. FRANK MORFORD,
FREDERICK J. WHEELER.